US008646565B2

(12) United States Patent
Gray, Jr.

(10) Patent No.: US 8,646,565 B2
(45) Date of Patent: Feb. 11, 2014

(54) HYDRAULIC HYBRID VEHICLE METHOD OF SAFE OPERATION

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 47 days.

(21) Appl. No.: 13/356,276

(22) Filed: Jan. 23, 2012

(65) Prior Publication Data

US 2012/0123661 A1    May 17, 2012

Related U.S. Application Data

(62) Division of application No. 11/583,205, filed on Oct. 18, 2006, now Pat. No. 8,118,132.

(51) Int. Cl.
*B60K 17/00* (2006.01)

(52) U.S. Cl.
USPC ........................................ 180/305

(58) Field of Classification Search
USPC ............ 180/165, 305, 306, 307; 60/414, 416, 60/417, 425
See application file for complete search history.

(56) References Cited

U.S. PATENT DOCUMENTS

| | | | |
|---|---|---|---|
| 3,236,049 A | 2/1966 | Reinke | 60/53 |
| 3,637,036 A * | 1/1972 | Swisher et al. | 180/307 |
| RE28,324 E * | 1/1975 | Greene | 180/22 |
| 4,309,917 A | 1/1982 | Leet | 74/861 |
| 4,530,416 A * | 7/1985 | Kassai | 180/307 |
| 4,951,627 A * | 8/1990 | Watanabe et al. | 477/111 |
| 5,489,246 A * | 2/1996 | Moody et al. | 477/96 |
| 5,887,674 A | 3/1999 | Gray, Jr. | 180/307 |
| 6,719,080 B1 | 4/2004 | Gray, Jr. | 180/165 |
| 6,996,982 B2 | 2/2006 | Gray, Jr. | 60/493 |
| 6,998,727 B2 | 2/2006 | Gray, Jr. | 290/40 |
| 7,082,757 B2 | 8/2006 | Teslak et al. | 60/414 |
| 7,146,266 B2 | 12/2006 | Teslak et al. | 701/69 |
| 7,147,239 B2 | 12/2006 | Teslak et al. | 280/306 |
| 7,712,565 B2 * | 5/2010 | Udagawa et al. | 180/242 |
| 2004/0011031 A1 | 1/2004 | Gray, Jr. | 60/325 |
| 2006/0021813 A1 | 2/2006 | Gray, Jr. | 180/165 |

FOREIGN PATENT DOCUMENTS

GB    2 416 570 A    2/2006

* cited by examiner

*Primary Examiner* — J. Allen Shriver, II
*Assistant Examiner* — Bridget Avery
(74) *Attorney, Agent, or Firm* — David H. Read

(57) ABSTRACT

A hydraulic hybrid vehicle includes elements such as a hydraulic pump driven by an internal combustion engine and arranged to draw in low pressure fluid and pump the fluid at high pressure to an accumulator. A hydraulic motor is powered by the pressurized fluid. Safety processes are provided for detecting and addressing a number of conditions that may arise in the operation of the hydraulic hybrid vehicle, including an initialization procedure for start-up of the vehicle, a shut-down procedure, and procedures for detecting and responding to failure of the pump or motor, internal and external fluid leaks, and non-responsive actuation and mode control systems.

14 Claims, 7 Drawing Sheets

HYDRAULIC HYBRID VEHICLE METHOD OF SAFE OPERATION

CROSS-REFERENCE TO RELATED APPLICATION

Figure 1:
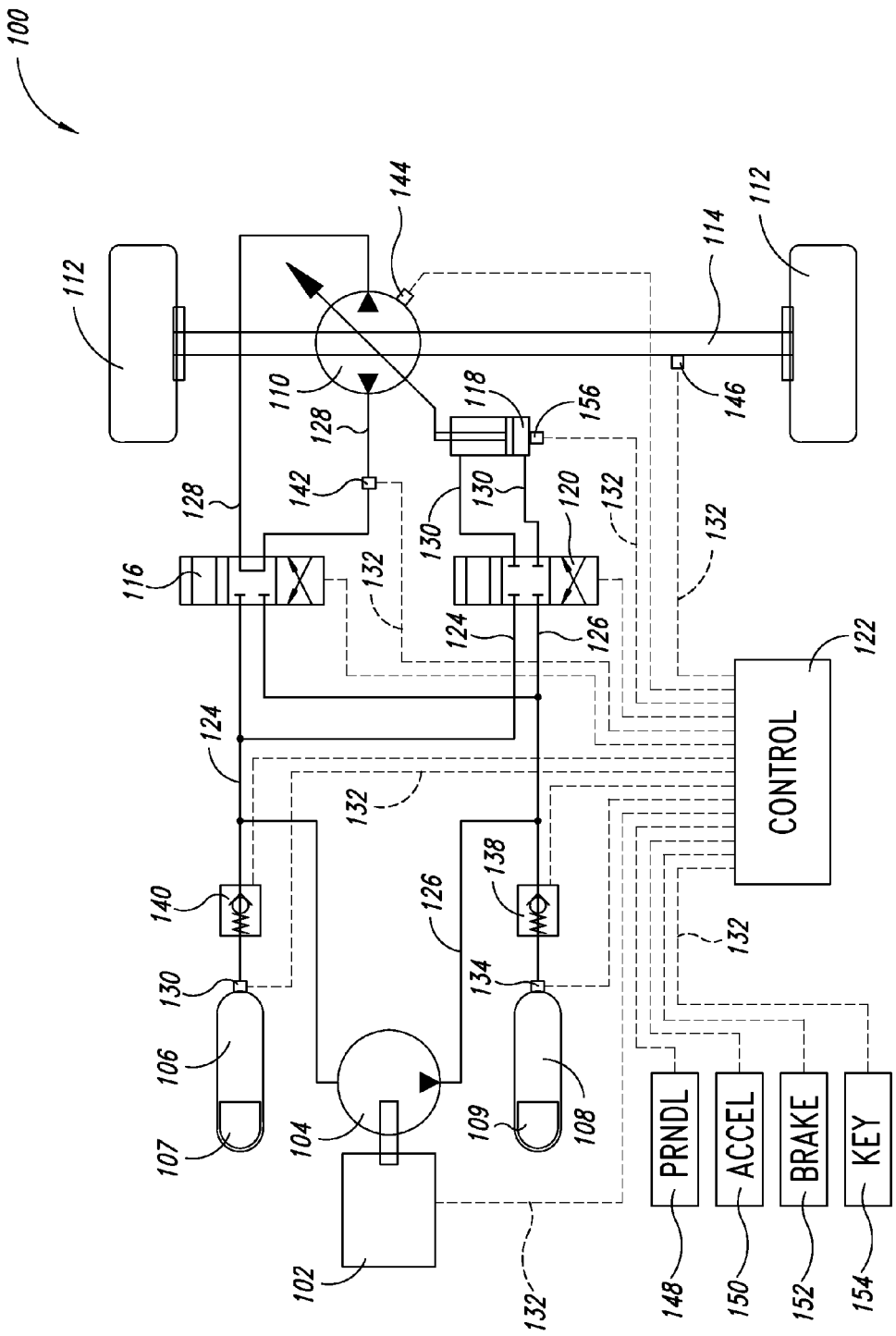

This application is a divisional of U.S. patent application Ser. No. 11/583,205, filed Oct. 18, 2006, now pending, which application is incorporated herein by reference in its entirety.

BACKGROUND OF THE INVENTION

1. Field of the Invention

The present disclosure is directed to processes for safe operation of a hydraulic hybrid vehicle system, and in particular, to processes for detecting and/or addressing safety conditions arising out of operation of the vehicle.

2. Description of the Related Art

Significant interest has been generated, in recent years, in hybrid vehicle technology as a way to improve fuel economy and reduce the environmental impact of the large number of vehicles in operation. The term hybrid is used in reference to vehicles employing two or more power sources to provide motive energy to the vehicle. For example, electric hybrid vehicles are currently available that employ an internal combustion engine and a generator which generates electricity that can be stored in a battery of storage cells. This stored energy is then used, as necessary, to drive an electric motor coupled to the drive train of the vehicle.

Hybrid vehicles may be grouped into two general classes, namely, parallel hybrid and series hybrid vehicles. Parallel hybrid vehicles are vehicles employing a more or less typical engine, transmission, and drive train, with additional components providing a second power path for the vehicle. According to one parallel hybrid scheme, the engine of a vehicle is used to generate surplus energy during periods when the vehicle is cruising at a steady speed, or otherwise demanding less than the engine is capable of providing when operating at its most efficient load. The surplus energy is then stored for future use.

It is known that internal combustion engines used in conventional motor vehicles are required to have a maximum output capacity that far exceeds the average requirements of the vehicle, inasmuch as such vehicles occasionally demand power output levels far exceeding the average power output, such as during acceleration from a stop, or for passing, etc. During these relatively brief periods of operation, much more power is required than during periods when the vehicle is cruising at a steady speed. Because of this requirement for a high level of available power, the engines in most conventional vehicles spend most of their time operating well below their most efficient speed and load.

By using excess capacity of the engine to produce energy that can be stored, the load on the engine can be increased to a point where the engine operates at a high level of fuel efficiency when in operation, while the excess energy is stored. The stored energy may then be used to enable engine-off operation, or to supplement the engine during periods when power requirements of the vehicle exceed the engine's maximum efficient output. Hybrid electric vehicles that are currently available generally operate according to the scheme broadly outlined above, utilizing a generator to add load to the engine and convert the excess power to electricity for storage in the battery, and later utilizing the battery and an electric motor to supplement the conventional drivetrain when more power to the wheels is required than can be efficiently produced by the engine alone.

There are other parallel hybrid vehicle configurations that have been proposed, that refine the basic system outlined above, or that provide some improved economy without departing significantly from the more conventional model. These other systems will not be discussed in detail here.

Series hybrid vehicles, in contrast to the parallel hybrid model, have no direct mechanical drivetrain between the engine and the drive wheels of the vehicle. They do not employ a drive shaft as described with reference to parallel hybrid vehicles. In a series hybrid vehicle, power from an engine is converted directly to a form that can be used by a secondary drive motor to power the vehicle, and that is also conducive to efficient storage. The engine can be operated at its most efficient load and speed without regard to variations in the speed of the vehicle. Depending on the capacity of the energy storage medium, a series hybrid vehicle may operate for extended periods with the engine shut down, operating on stored energy alone. Series hybrid vehicles are potentially more efficient than parallel hybrids because of the greater freedom to control engine operation for maximum efficiency, and because of the elimination of the mechanical drivetrain linking the engine to the wheels, thereby reducing the net weight of the vehicle, as compared to a parallel hybrid vehicle.

While electric hybrid vehicles have been briefly mentioned above, there is growing interest in the development of hydraulic hybrid vehicles, due to the potential for greater fuel economy, lower operating costs, and a lower environmental impact, as compared to electric hybrid vehicles. The greater fuel economy arises in part because of the relative superior efficiency of hydraulic systems in converting kinetic energy to a storable form, and in reconverting the stored energy potential to kinetic energy. The potential for lower operating costs is due to the fact that electric storage batteries currently available for use in hybrid vehicle operation are expensive and have a limited lifespan, with potential replacement at significant cost to the vehicle owner. The storage batteries are also an environmental concern because they contain large amounts of heavy metals that must be disposed of when the worn-out batteries are removed from the vehicles. Hydraulic systems such as might be employed in hybrid vehicles do not employ components that inherently require replacement, nor do they employ large amounts of toxic or harmful substances.

The configuration and operation of parallel and series hybrid vehicles are described in greater detail in the following references: U.S. Pat. No. 5,887,674, U.S. patent application Ser. No. 09/479,844, and U.S. patent application Ser. No. 10/386,029, all of which are incorporated herein by reference, in their entirety.

BRIEF SUMMARY OF THE INVENTION

According to various embodiments of the invention, safety processes are provided for detecting and addressing a number of conditions that do or might arise in the operation of a hydraulic hybrid vehicle system.

The disclosed embodiments include an initialization procedure for start-up of a hydraulic hybrid vehicle, as well as a shut-down procedure. Additionally, procedures for detecting and responding to failure of a motor, internal and external fluid leaks, and non-responsive actuation and mode control systems are provided.

BRIEF DESCRIPTION OF THE SEVERAL VIEWS OF THE DRAWING(S)

FIG. 1 is a schematic diagram of a hydraulic hybrid vehicle system according to an embodiment of the invention.

Each of FIGS. 2-7 is a flow diagram illustrating a process related to safe operation of a hydraulic system such as that illustrated in FIG. 1, according to an embodiment of the invention.

DETAILED DESCRIPTION OF THE INVENTION

The present disclosure is directed to innovations and improvements in hybrid hydraulic technology. Accordingly, where reference is made to hybrid vehicles, or hybrid technology, it may be assumed that the reference is directed to hydraulic hybrid vehicles, in particular, unless otherwise noted. Aspects of the invention will be described with reference to a bent-axis pump/motor, such as is well known in the art, though, where a claim recites a motor, the scope of the claim includes any hydraulic machine that can be adapted to operate as claimed, and may include, for example, swash plate and radial piston machines.

FIG. 1 is a simplified schematic diagram of a hydraulic hybrid vehicle system 100. The vehicle 100 includes an internal combustion engine (ICE) 102 whose output shaft is coupled to a hydraulic pump 104. The pump 104 is configured to draw low-pressure fluid from a low-pressure accumulator 106 (LPA) and pump the fluid at high pressure to a high-pressure accumulator 108 (HPA). The high-pressure fluid is used to drive one or more hydraulic pump-motor(s) (hereafter motor) 110, which in turn applies torque to drive wheels 112 via axles 114 and a differential (not shown). According to an alternate embodiment, a transmission is also provided.

The pump 104 is shown as a fixed-displacement pump, but it may be a variable displacement pump, in which case the load on the engine can be modified by changing the displacement of the pump. Additionally, the pump 104 may be a pump/motor to permit the use of the pump 104 as a motor to start the engine by fluid pressure.

The motor 110 of the embodiment described is a positive-angle pump/motor, i.e., capable of stroking from zero to a positive stroke angle. The motor may alternatively be an over-center pump/motor, capable of stroking to both positive and negative stroke angles. Thus, where, for example, the specification or claims refer to a stroke angle of greater than zero, this is to be construed as meaning an absolute value greater than zero, i.e., either in a negative or positive direction. It will also be recognized that the fluid circuit will be arranged differently than shown in FIG. 1 to accommodate an over-center motor. Nevertheless, it is within the abilities of one of ordinary skill in the art to adapt the embodiments described hereafter for use with an over-center motor. U.S. patent application filed on Sep. 29, 2006, and provides details of an over-center fluid circuit. Other circuits are known in the art.

The LPA and HPA are pre-charged with gas cells 107, 109, respectively, that are compressed as fluid is pumped into the respective accumulator. The pressure of the compressed gas provides the motive force for the hydraulic operation of the vehicle system 100.

A mode valve 116 is provided to control polarity of the fluid to the motor 110, and an actuator 118 is coupled to the motor 110 to control displacement. A control valve 120 controls operation of the actuator 118. Low-pressure fluid lines 124 couple the LPA 106 to the pump 104 and the valves 116, 120, while high-pressure fluid lines 126 couple the HPA 108 to the pump 104 and the valves 116, 120. Motor fluid supply lines 128 couple the mode valve 116 to the motor 110, and actuator fluid supply lines 130 couple the control valve 120 to the actuator 118.

The mode valve 116 is shown as a three-position valve. In a first position, the valve 116 places a first fluid port of the motor 110 in fluid communication with the high pressure fluid supply while placing a second fluid port of the motor 110 in fluid communication with the low-pressure fluid supply. In this configuration, the motor 110 applies a forward torque to the drive wheels 112, tending to drive the vehicle forward. In a second position, the valve 116 places the first fluid port of the motor 110 in fluid communication with the low-pressure fluid supply 106 while placing the second fluid port of the motor 110 in fluid communication with the high-pressure fluid supply 108. In this configuration, the motor 110 applies a reverse torque to the drive wheels 112, tending to drive the vehicle 100 in reverse. In a third position, the valve 116 places the first fluid port in fluid communication with the second fluid port, creating a closed loop, in which condition the motor 110 is free to rotate, but does not receive any motive power.

The control valve 120 is also shown as a three position valve, and the actuator is shown as a double action (push-pull) actuator. In a first position, the control valve 120 places a first fluid chamber of the actuator 118 in fluid communication with the HPA 108 while placing a second fluid chamber of the actuator 118 in fluid communication with the LPA 106. In this position, the motor 110 is stroked toward a maximum displacement, which will increase the power output of the motor 110. In a second position, the control valve 120 places the first fluid chamber of the actuator 118 in fluid communication with the LPA 106 while placing the second fluid chamber of the actuator 118 in fluid communication with the HPA 108. In this position, the motor 110 is stroked toward a minimum displacement, decreasing the power output of the motor 110. In a third position, the control valve 120 closes the actuator supply lines 130, hydraulically locking the actuator 118 in place and holding the displacement of the motor 110 at a constant value.

Pilot controlled check valves 138, 140 are positioned in the high- and low-pressure fluid lines 126, 124, respectively. Valves 138, 140 are arranged to always permit fluid flow into the respective accumulator to avoid the possibility of excess pressure build up in the respective fluid lines. When one or the other of these valves are opened, as mentioned in several of the disclosed embodiments, this refers to the pilot operation of the valve, in which fluid flow away from the respective accumulator is also enabled. Where the claims recite coupling a high- or low-pressure fluid supply to a system, this is to be construed to include opening a one-way valve to two-way operation, such as described with reference to valves 138, 140.

A number of sensors are provided to monitor various aspects of the operation of the vehicle 100. These include sensors 134, 136 coupled to the high- and low-pressure accumulators 108, 106, respectively, configured to measure fluid pressure and flow rate; rotation sensors 146 (only one of which is shown) for measuring rotation speed of the wheels 112; position sensor 156 for determining the stroke angle of the motor 110; pressure sensor 144 for measuring a fluid pressure inside the casing of the motor 110, and another (not shown) for measuring a fluid pressure inside the casing of the pump; flow sensor 142 positioned in one of the motor fluid supply lines 128; shift indicator sensor (PRNDL) 148 for detecting a position of a shift indicator; accelerator position sensor (APS) 150 for monitoring a position of an accelerator pedal; brake position sensor (BPS) 152 for monitoring a position of a brake pedal; and key position sensor (KPS) 154. Additionally, the ICE 102 is provided with a typical suite of engine sensors (not shown separately) such as are commonly employed in modern vehicles, such as, for example, throttle position sensor, coolant temperature sensor, oil pressure sensor, rpm sensor, etc.

Either or both of the accumulators 106, 108 may include a "fuse" valve (not shown) configured to close if a maximum flow rate value is exceeded. Any or all of the check valves 138, 140, the flow rate sensors 134, 136, and the fuse valves may be integrated, and may be located in or on the respective accumulators 108, 106.

The position sensor 156 is shown coupled to the actuator 118, though the position sensor 156 may instead be positioned at or in the motor 110. According to an embodiment, there may be more than one position sensor 156, as will be explained later in this disclosure. The shift indicator sensor 148 detects a position of a shift indicator via which a driver selects a mode of vehicle operation from among a number of choices such as, for example, P (park), R (reverse), N (neutral), D (drive), and L (low, in those embodiments that include a transmission and/or one or more additional motors).

A control unit 122 controls many aspects of the operation of the vehicle 100, including the ICE 102, the mode valve 116, the control valve 120, and the check valves 138, 140. Control lines 132, shown in dotted lines, are coupled between the control unit 122 and components of the system, including the mode and actuator control valves 116, 120, the check valves 138, 140, and the ICE 102. Control lines 132 also couple the control unit to the various sensors of the system. The check valves 138, 140 and valves 116, 120 may be controlled by any of electrical, mechanical, or hydraulic means, such as is well known in the art. Additionally, the sensors may provide data to the control unit by any of a number of mediums, including digital or analog electrical signals, hydraulic or pneumatic pressure, mechanical linkage, etc. Accordingly, the control lines 132 are shown merely to indicate an operative connection, and are not intended to suggest the nature of the connection.

The ICE 102 drives the pump 104, which pumps fluid at high-pressure into the HPA 108. The control unit 122 monitors the fluid pressure in the HPA and controls the operation of the ICE 102 to maintain the fluid pressure within an acceptable range. Pressurized fluid from the HPA 108 is utilized to control the displacement of the motor 110 and to power the motor 110 to apply torque to the drive wheels 112. A number of schemes for managing the operation of an ICE in a hydraulic hybrid vehicle have been proposed, any of which may be appropriately employed with the embodiment described here. Some of these schemes may be found in the previously listed U.S. patents and U.S. patent applications.

The vehicle 100 is also configured to employ regenerative braking. When the vehicle is traveling forward, and the operator applies the brake, the mode valve 116 is moved to its second position, which, as described above, causes the motor 110 to apply torque in the reverse direction. The amount of reverse torque is controlled by the displacement of the motor 110, which in turn is controlled by the amount of pressure (or depression) applied by the operator on the brake pedal. Because of the forward motion of the vehicle 100, the motor 110 continues rotation in the forward direction, even though it is applying torque in the reverse direction. In this configuration the motor 110 operates as a pump, drawing fluid from the LPA 106 and pumping the fluid at high pressure to the HPA 108. This creates drag on the rotation of the axles 114, which is transferred to the drive wheels 112, slowing the vehicle 100. In this way, a portion of the kinetic energy of the moving vehicle is recovered and stored for later use. Thus, energy that would otherwise be lost to friction in the brakes of the vehicle is recovered and stored, to be released later, e.g., to assist the vehicle 100 in accelerating.

To operate the vehicle 100, a driver turns a key or otherwise selects start-up of the vehicle 100. The control unit 122 is powered up, the KPS detects the start-up command, and the control unit initializes the system. When the shift indicator indicates a forward "gear" or position, the control unit 122 controls the mode valve 116 and the control valve 120 according to a position of the accelerator pedal or brake pedal. When the driver depresses the accelerator pedal, the mode valve 116 is moved to the first position, applying fluid pressure to the motor 110, and the control valve 118 is controlled to increase displacement of the motor, converting fluid pressure to torque to accelerate the vehicle. When the driver lets up on the accelerator, the displacement of the motor is reduced accordingly, and, if the accelerator pedal is fully released, the mode valve may be switched to the neutral mode, which relieves the motor of even the minimal drag caused by fluid pressure on the moving parts. When the operator steps on the brake, the vehicle is slowed by regenerative braking, as described above. When the driver selects P or N at the shift indicator, the accelerator pedal is decoupled from the operation of the motor so that the vehicle cannot be driven in these driving modes.

In the use of hydraulic technology, some concerns arise because hybrid vehicles do not share all the same operating characteristics with conventional vehicles, while other concerns are inherent to hydraulic systems. Some potentially dangerous situations can arise through the actions of a vehicle operator, while others may be due to malfunctions. In any event, these concerns must be addressed before such vehicles can be commercially produced or sold. It must be recognized that conventional passenger vehicles have been evolving for over a century, and that they have become standardized to such a degree that an individual can learn to drive in virtually any make or model of vehicle, and thereafter be fully capable of driving any other make or model of vehicle. An obvious exception to the rule is in the matter of automatic vs. standard transmissions, but even in this case, the exception is so well known that most drivers who have not learned to operate a standard transmission vehicle know the difference and how to recognize such a vehicle.

With the advent of hybrid vehicles, there are many previously unknown situations that might arise, for which a typical driver may be unprepared. The inventor has recognized that to the extent a hybrid vehicle can be made to interact with a driver in a manner that is substantially similar to a conventional vehicle, the driver will be better equipped to react appropriately to everyday occurrences, as well as most emergencies.

The flow diagrams of FIGS. 2-7 outline operation of a hydraulic hybrid vehicle according to various embodiments of the invention. In detailing some of those embodiments, reference will be made to components disclosed with reference to the vehicle 100 of FIG. 1. It will be recognized that the system of FIG. 1 is merely exemplary, showing one of many possible configurations. Other systems may not include all the features described with reference to FIG. 1, and will probably include features not described. Functions performed in the disclosed embodiments by particular elements may, in other embodiments, be performed by different elements. For example, where the mode valve 116 is shown schematically as a single valve, in many hydraulic systems the functions described herein with reference to the one valve are performed by two poppet valves. With regard to control elements such as sensors and the control unit, descriptions of the other embodiments of the invention may not specifically recite a particular sensor as performing a described function, but one of ordinary skill in the art will recognize disclosed elements that could be employed to fulfill the function, and will also recognize a number of alternative configurations that could be adapted to operate in particular applications, given the relevant design considerations. Finally, the functions described with reference to the control unit may be performed by a single unit such as a microprocessor or the like, may be broken up among a number of elements, or may be part of the operation of an element or elements configured to perform other tasks.

Figure 2:
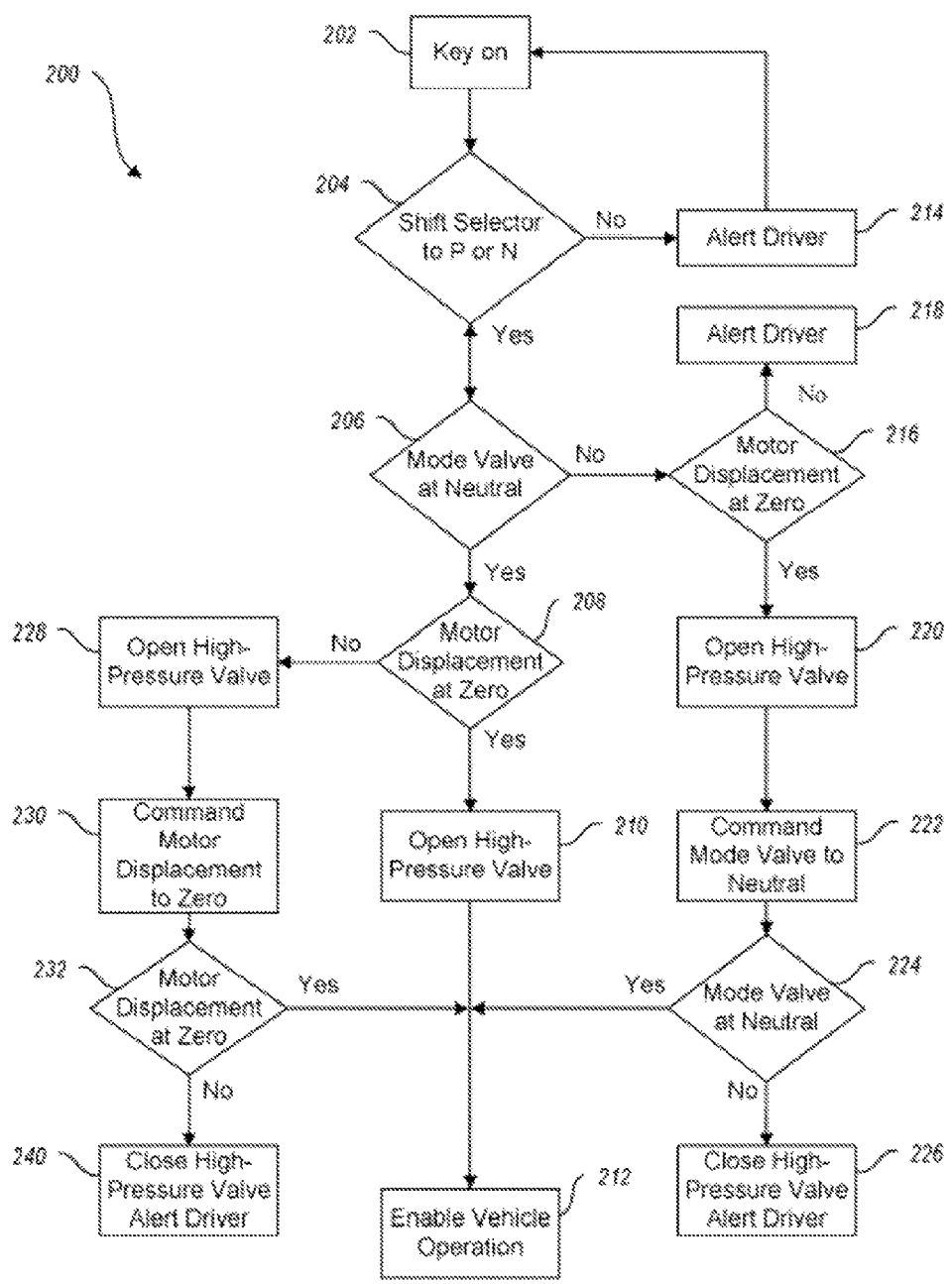

Referring now to FIG. 2, a start-up procedure 200 is disclosed, according to an embodiment of the invention. In step 202, the driver turns the key or otherwise starts initialization of the vehicle's operation system. The control unit confirms that the shift selector is in either park or neutral (204). If not, i.e., if the shift selector is in one of the forward settings or the reverse setting, the driver is notified of the cause for a non-start (214), and no further action is taken. If the shift selector is in the Park or Neutral position, the control unit confirms that the mode valve 116 is in the neutral position (206), and, if so, that the motor 110 is set at zero displacement (208). If the motor 110 is set at zero displacement, the high-pressure valve 138 is opened (210), and normal operation of the vehicle is enabled (212).

If, at step 208, the motor displacement is found to be greater than zero, the high-pressure valve is opened (228), and the motor is commanded to a displacement of zero (230). The displacement is again checked (232), and if the motor 110 has moved to a displacement of zero, the system is enabled for normal operation (212). If the motor 110 has not moved to a zero displacement, the high-pressure valve 138 is closed, and the operator is alerted to a critical system fault (CSF) condition (240), i.e., that the system is inoperative and in need of repair or service before the vehicle can be operated.

Where a CSF condition is signaled to an operator, this may be as basic as a light or other indicator on the vehicle instrument panel, in combination with the vehicle system shutting down, or the signal may provide more detailed information such as the nature of the fault, the defective component, or the type of service required.

Returning to step 206, if the mode valve is found to be at a position other than neutral, the control unit attempts to confirm that the motor displacement is at zero (216). If the motor displacement is not at zero, the system signals a CSF to the driver (218). If the motor displacement is confirmed to be at zero at step 216, the high-pressure valve 138 is opened (220), and the mode valve is commanded to neutral (222). Again, the position of the mode valve is checked. If it has moved to neutral, the system is enabled for normal operation (212). If the mode valve has not moved to neutral, the high-pressure valve 138 is closed, and the operator is alerted to a CSF condition (226).

The time required to move through the process outlined above may be in the range of a few hundred milliseconds to as much as a second, but, with regard to the operator's perception, it can be performed almost instantaneously, so that the operator can "start" the vehicle and drive away without any perceived delay.

It will be recognized that there is no absolute need to require that the shift indicator be in Park or Neutral to start up the system of the vehicle 100, inasmuch as, with the mode selector in neutral and the displacement at zero, there would be no power transfer to the wheels during start-up. However, a driver who has learned to drive in a conventional vehicle may be accustomed to applying pressure to the accelerator pedal as the key is turned, to provide extra fuel to the engine during start-up. During normal operation of the hybrid vehicle 100, pressure on the accelerator pedal is measured to establish the displacement of the motor 110, so if the pedal were depressed during start-up, the vehicle could jump forward unexpectedly as soon as initialization was complete. Rather than attempting to modify the behavior of the driver, operational safety is more surely obtained by establishing the artificial requirement of shifting to P or N to start (with control of motor displacement disabled in these settings). According to an alternate embodiment, the start-up procedure outlined in FIG. 2 also includes starting the ICE when the system is enabled at step 212, even if the stored energy in the HPA is sufficient to operate initially without the ICE. This start-up of the ICE will provide the driver with familiar cues that the vehicle is powered up and ready to drive. The control unit may also be programmed to slave the throttle control of the ICE to the accelerator pedal to permit revving of the ICE during start-up and before the shift selector is moved away from the P or N positions, for reasons similar to those previously mentioned (as used here, the term throttle, e.g., throttle control, or throttle position, refers to the fuel rate of the ICE).

According to embodiments of the invention, there are subroutines that may be performed serially or concurrently with the start-up process outlined above as part of an initialization of a vehicle system. For example, FIG. 3 outlines a check process 300 for the low-pressure side of the hydraulic circuit of the vehicle, according to one embodiment.

After the operator turns the key (202), the low-pressure valve 140 is opened (302), which permits fluid to flow from the LPA 106 into the system. Fluid flow from the LPA is then measured (304) and compared to a threshold value (306). If there is a fluid flow that exceeds the threshold, the pressure valve 140 is closed and the operator is alerted to a CSF condition (308). If, on the other hand, any fluid flow is below the threshold, the system can proceed with opening the high-pressure valve 138 in accordance with one of the steps outlined with reference to FIG. 2, such as for example, at step 210.

In a typical hydraulic system, some leakage is normal, as fluid escapes past valves, seals, and pistons. However, under the circumstances outlined with reference to FIG. 3, the system is closed, there is no energy transfer underway, and none of the components are in operation. In a closed and inactive system, the only places that the low-pressure fluid might be expected to flow to are the casings of the pump 104 and the motor 110. Accordingly, any flow rate detected would be expected to be very modest. Thus, if the flow rate exceeds the threshold, this is an indication that there is a fluid leak to the outside of the system, such as from a ruptured line, a defective fitting, etc. Even then, the control unit may be programmed to warn the operator of a low-pressure leak, indicated by a flow exceeding the threshold, but otherwise permit operation of the system, unless the flow exceeds a second threshold, indicating a more serious rupture.

Figure 4:
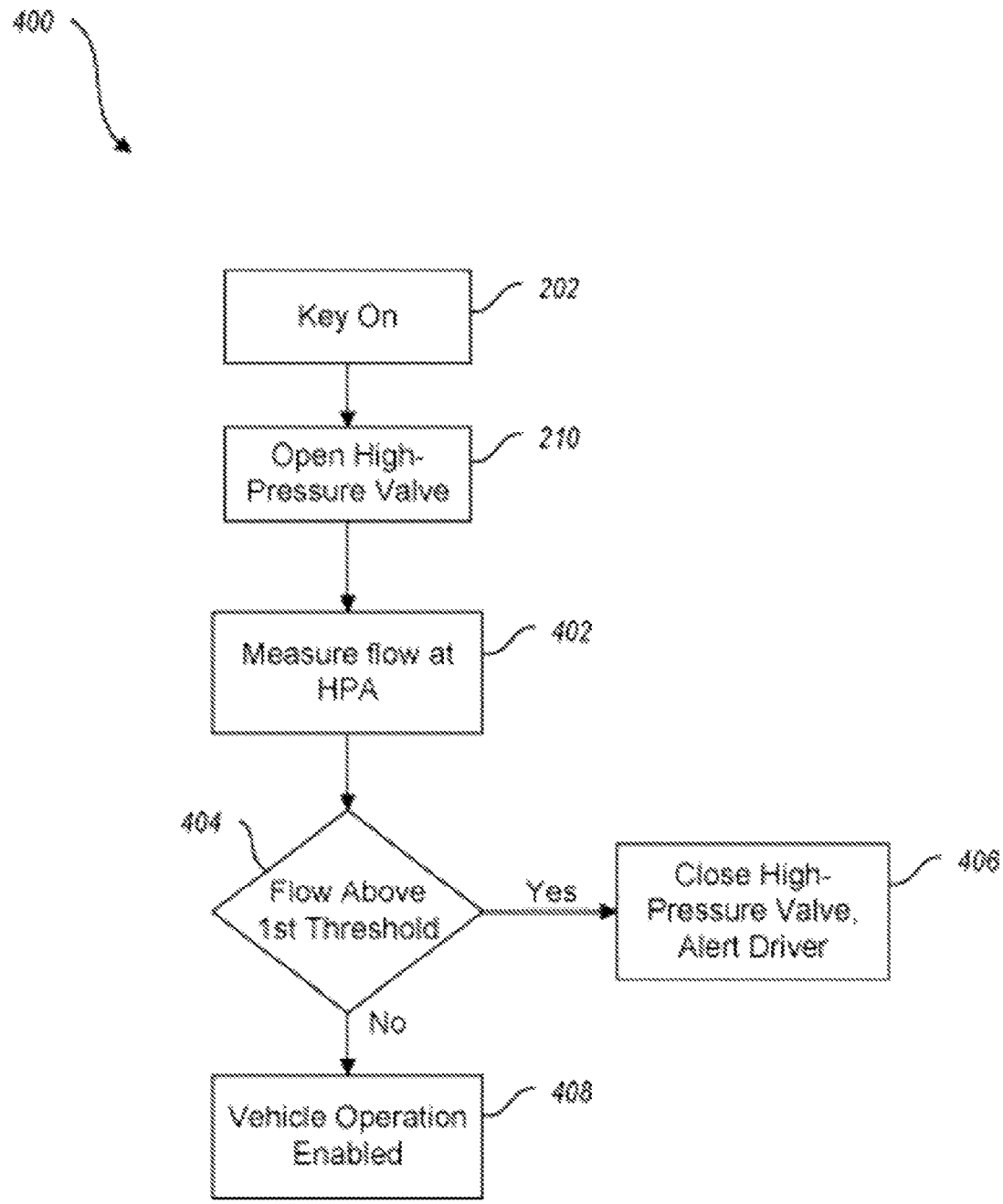
Figure 5:
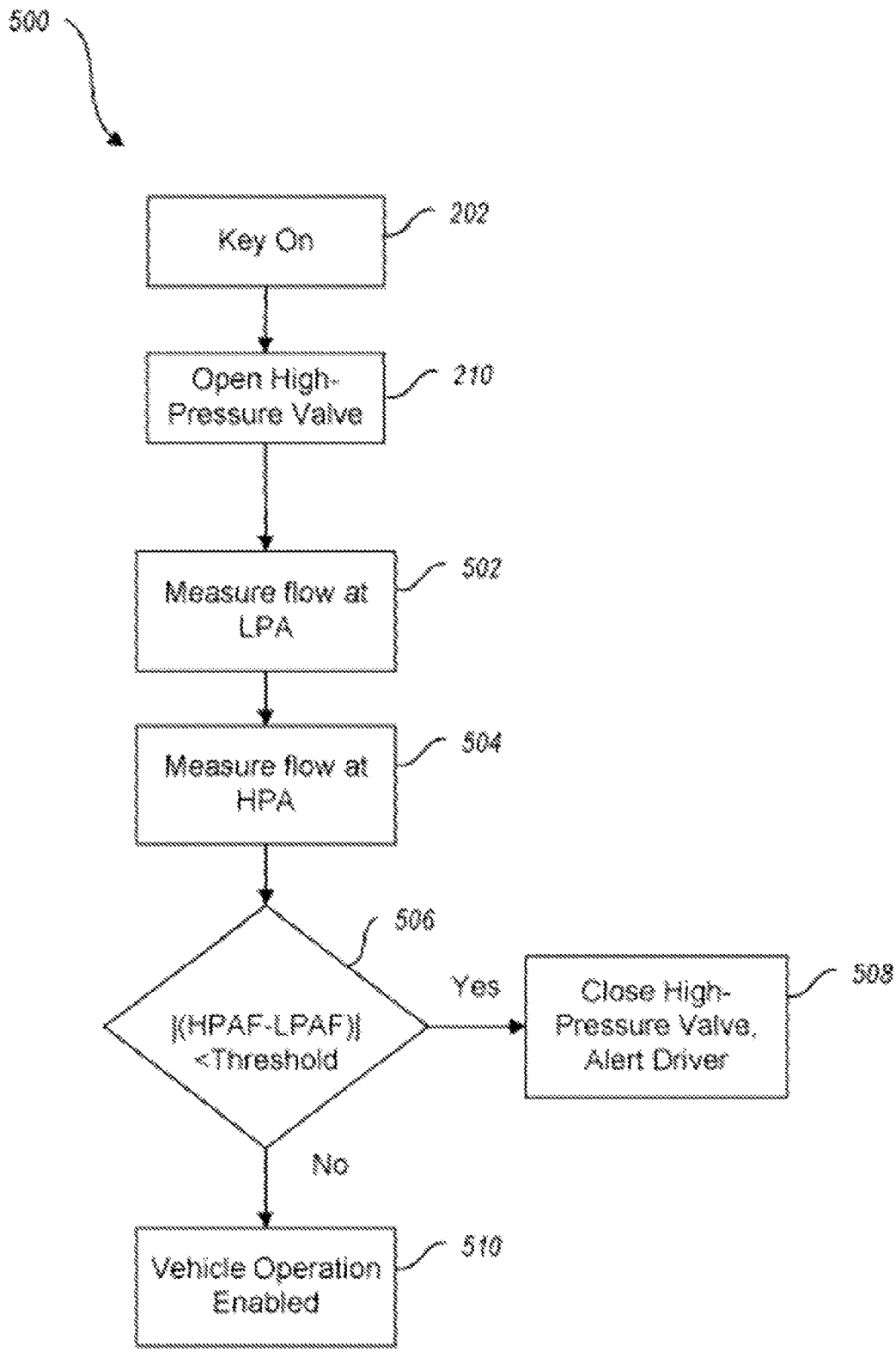

FIG. 4 illustrates a similar process for checking the high-pressure side of the fluid circuit. Following the key on step (202), the high-pressure valve 138 is opened, such as at step 210, 220, or 228 of FIG. 2, which permits fluid to flow from the HPA 108 into the system. Fluid flow at the HPA is then measured (402) and compared to a threshold value (404). If there is a fluid flow that exceeds the threshold, the high-pressure valve 138 is closed and the operator is alerted to a CSF condition (406). If fluid flow is below the threshold, operation of the system is enabled, at least with respect to the concerns addressed in the process of FIG. 4 (408).

Figure 3:
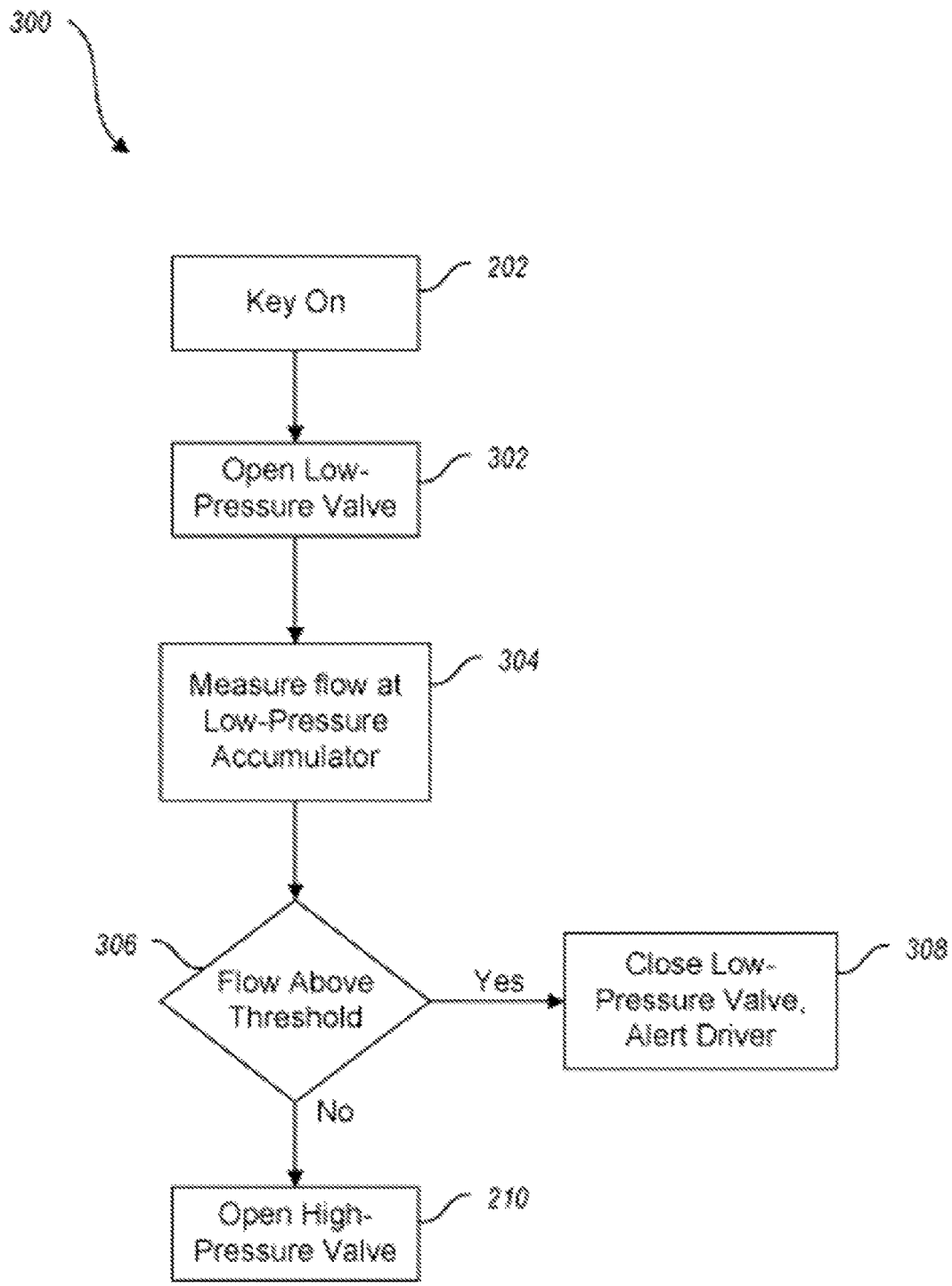

As with the process outlined in FIG. 3, measuring flow of high-pressure fluid into the system may detect leaks, including leaks out of the system. As previously explained, there is generally some internal leakage that is inherent in a hydraulic system, which is tolerable in a normally operating system. It will be recognized that high-pressure fluid flowing past valves or seals of the system to the low-pressure side of the circuit will flow into the LPA 106. If the fluid flow exceeds the threshold, this indicates either a defective component or seal in the system, which is allowing high-pressure fluid to escape to the low-pressure side of the circuit, or it indicates a leak of fluid out of the system. Either fault is sufficient to prompt a CSF condition.

In a closed system, the fluid flow at the HPA will be equal to the flow at the LPA, and any difference in flow between the HPA and the LPA indicates a loss of fluid from the system, i.e., a leak outside the system. This process is outlined in FIG. 5. After the key is turned on (202) and the high-pressure valve is opened (210), the fluid flow at the LPA is measured (502). Additionally, the flow at the HPA is measured (504). The high-pressure accumulator flow (HPAF) is compared to the low-pressure accumulator flow (LPAF) (506). If an absolute value of the difference between the HPAF and the LPAF exceeds a threshold, the system closes the high-pressure valve and alerts the driver of a leak outside the system (508). If the difference does not exceed the threshold, the system is enabled for start-up (510).

Figure 6:
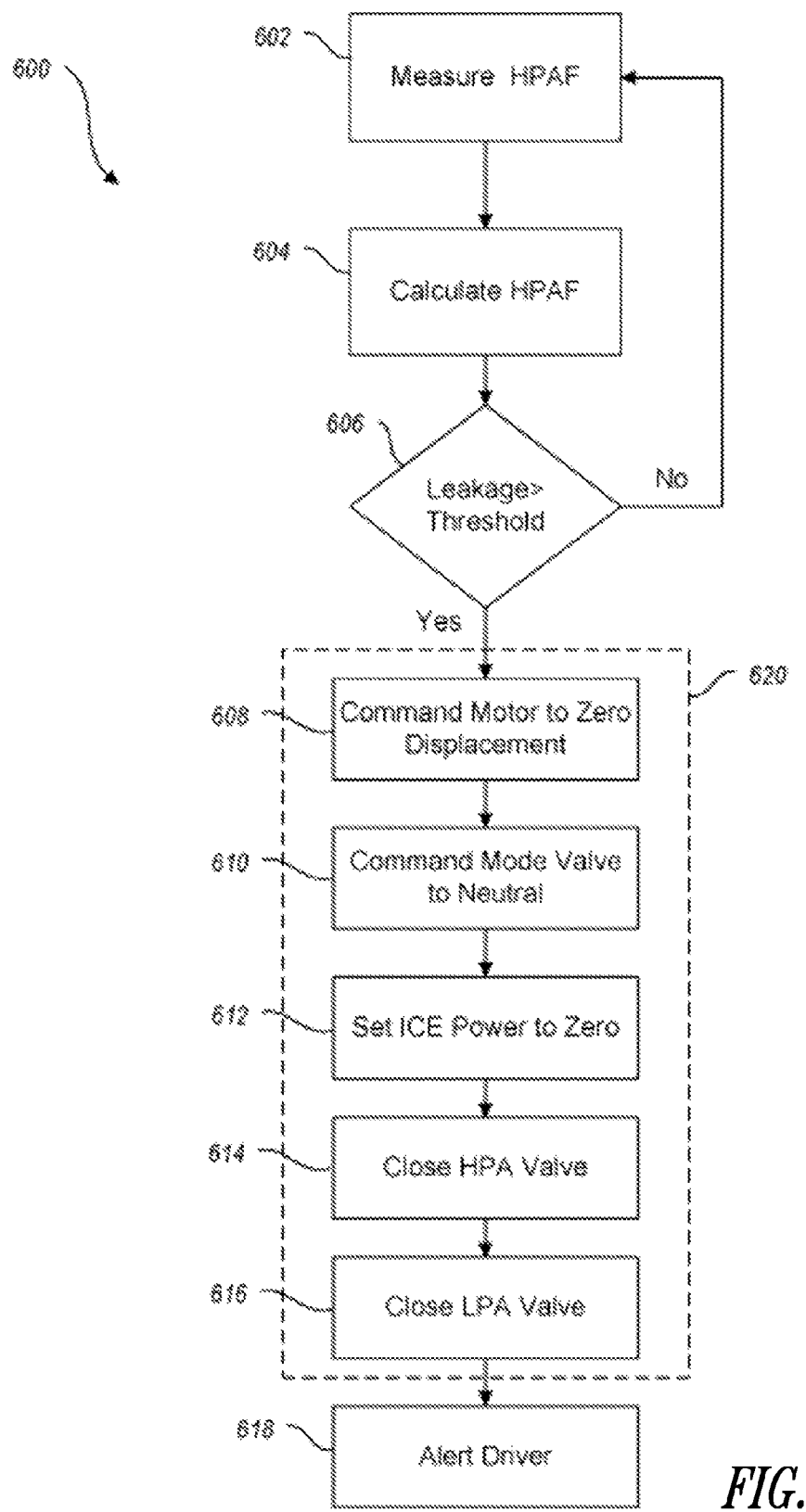

Referring now to FIG. 6, another process 600 is provided for detecting excessive external or internal leaking of a hydraulic vehicle system such as that described with reference to FIG. 1, during normal operation of the vehicle. Fluid flow at the HPA is measured (602). A HPA flow value is calculated, based upon operating characteristics of the motor 110 and/or pump 104 (604), and compared with the measured fluid flow. The difference between the calculated value and the measured value represents the amount of fluid that is leaking past components in the system. If leakage exceeds a threshold value (606), the motor is commanded to a zero displacement (608), the mode valve is commanded to neutral position (610), the ICE is shut down (612), the HPA valve 138 is closed (614), the LPA valve 140 is closed (616), and the driver is alerted to a CSF condition (618). Steps 608-616, indicated by reference number 620, will hereafter be referred to collectively as an auto shut-down procedure.

In more detail with regard to step 604, when the motor 110 is operating properly, the volume of fluid passing through the motor can be calculated very accurately. For example, if the displacement of the motor 110 is set at 10 cubic inches (in³), a single rotation of the motor 110 will move 10 in³ of fluid through the motor. Thus, a fluid flow for comparison can be calculated by multiplying the known displacement by the rpm of the motor. Any difference is due to leakage. The process of FIG. 6 is best performed when the motor 110 is operating while the pump 104 is not in operation. This avoids the added complication of factoring the displacement of the pump 104 into the equation, though if both the motor 110 and pump 104 are in operation, the calculation can still be performed. By the same token, the test can be performed while the motor 110 is inactive but the pump 104 is in operation, using the displacement of the pump 104 to compare with the measured flow rate.

An excessively high internal leakage rate, such as would be detected by the process of FIG. 6, is indicative of internal damage to a pump or valve. Performing the auto shut-down helps prevent or limit further damage to the system that might occur as a result of continued operation.

The auto-shutdown procedure 620 is performed in situations where a potentially dangerous situation may exist and operation of the vehicle must be terminated to prevent danger to the occupants of the vehicle, severe damage to the system, or danger to other vehicles on the road. In the case of a high-pressure fluid leak outside the system, such as would be detected by one or more of the processes of FIGS. 4-6, if the leak is not detected, the high pressures in the system can very quickly turn a minor leak into a very large one. Depending on the size of the vehicle, the system may have 10-20 gallons of hydraulic fluid, which is generally some type of oil. The hydraulic lines and valves that supply fluid from the accumulators 106, 108 to the motor 110 are designed to accommodate a flow of more than 100 gallons per minute (gpm) at pressures exceeding 4,000 psi. If, for example, a hose fitting were to burst, the entire fluid contents of the system could be deposited on the road behind the vehicle in less than ten seconds. Such a volume of oil being poured unexpectedly on a highway could create a hazardous situation.

On the other hand, when performing an auto shut-down, it is important that the order of steps be such that the vehicle is allowed to coast to a stop, so that the driver can steer off the road, and also to avoid the possibility that the motor 110 freezes, locking the wheels into an uncontrolled skid. Referring to FIG. 1, the actuator 118 is powered by hydraulic pressure. In many embodiments, either or both of the mode valve 116 and the actuator control valve 120 are also operated by hydraulic pressure. If either the displacement actuator 118 can be moved to zero, or the mode valve 116 can be moved to neutral, the motor 110 will rotate freely, without power, allowing the vehicle to coast. By commanding the motor 110 to zero displacement and the mode to neutral before the HPA valve 138 is closed, fluid pressure in the system can be used to perform the commands. Even if the auto shut-down is in response to a malfunction in one of these subsystems, the other subsystem will bring the motor to an effectively neutral condition. If the ICE 102 is driving the pump 104 when the auto shut-down occurs, closing the LPA valve 140 before shutting down the ICE will deprive the pump 104 of low-pressure fluid, and the pump 104 will cavitate. This can damage the pump 104, and will also suddenly remove the load from the ICE, which may over-rev as a result. Shutting down the ICE prior to closing the LPA valve will prevent this from occurring.

Similarly, in some systems, closing the HPA valve 138 before shutting down the ICE may cause the pump 104 to hydraulically lock, producing very high pressure, or the motor 110 to suddenly exert a higher output torque, depending, in part, on the exact circuit arrangement and the positions of other valves in the system. Either outcome could damage components of the system and create a dangerous driving condition. This can be avoided by shutting down the ICE prior to closing the HPA valve.

Figure 7:
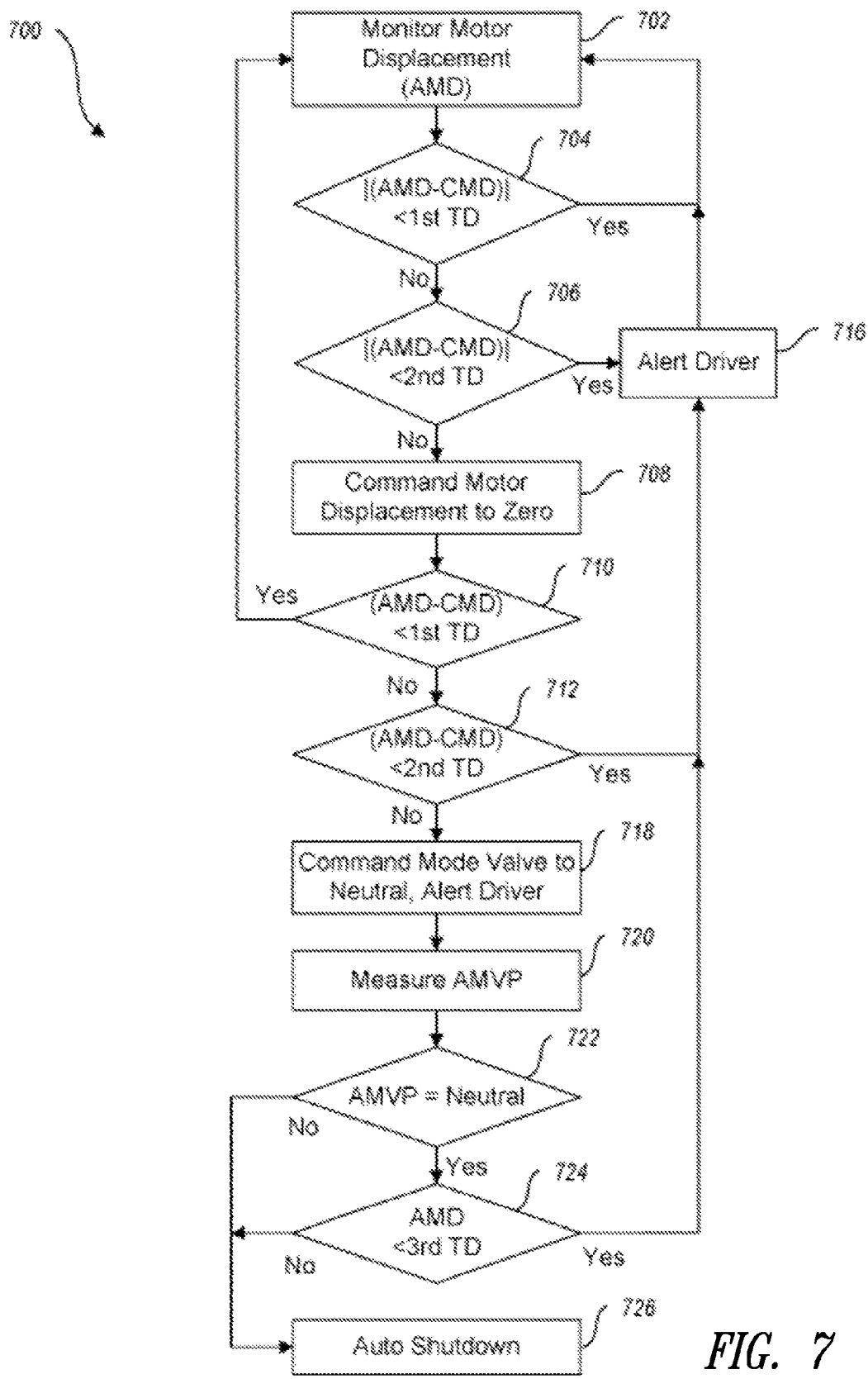

Turning now to FIG. 7, a process 700 is provided for monitoring the displacement control of the motor 110. At step 702, the actual motor displacement (AMD) of the motor 110 is measured, then compared to the commanded motor displacement (CMD) (704). If an absolute value of the difference between AMD and CMD does not exceed a first threshold (TD) (704), the process loops back to step 702. If the difference exceeds the first threshold, but not a second threshold (706), the operator is notified of a non-critical system fault (NSF) at step 716, but the process loops to step 702 and the system continues in operation (this process up through step 706 may also apply to pump 104 if its displacement is variable). If the difference exceeds the second threshold at step 706, the motor 110 is commanded to zero displacement (708) and a new comparison is made to determine if, following the new command, the difference is now below the first threshold (710) or the second threshold (712). If, following the new command, the difference is below the first threshold, the process loops to step 702. If the difference is below the second threshold (712), the operator is notified of a NSF at step 716 and the process loops to step 702. If, after the new command, the difference still exceeds the second threshold, mode valve 116 is commanded to neutral (718). At step 720, the actual mode valve position (AMVP) of the mode valve 116 is measured, then compared to the neutral position (722). If the AMVP is neutral, the AMD is compared to a third displacement threshold (724) and, if the AMD is less than the third threshold, the operator is notified of a NSF at step 716 and the process loops to step 702. If the AMVP does not return to neutral or the AMD is greater than the third threshold, an auto-shutdown is performed (620) and the operator is notified of a CSF at step 726. In one alternate embodiment, steps 706, 708, and 710 are eliminated, and mode valve 116 is commanded to neutral (718) based on an initial determination at step 712 that the difference exceeds the second threshold.

A difference between commanded and actual motor displacement can be caused by a malfunction in the actuation control valve 120, the actuator 118, or the motor 110. If the displacement changes in response to a command, but does not fully move to the commanded displacement, this may indicate a worn yoke bearing in the motor, a sticky piston in the actuator, or some other malfunction that introduces excessive friction to the displacement control mechanism. Such a condition should be corrected as soon as possible, but may not require an auto shut-down, provided the mismatch is not severe. Accordingly, the driver is notified, but the system is allowed to continue in operation. However, if the motor 110 sticks in a high displacement condition and does not move to zero when commanded, this is the equivalent of the throttle sticking open in a conventional automobile, which can be very dangerous and requires a prompt response. The problem may be as simple as a small bit of grit that is jammed in the valve 120. By attempting to zero the displacement (step 708), a transitory problem may be corrected without resorting to an auto shut-down.

As with the CSF, a NSF signal may simply consist of a light or other indicator on the vehicle instrument panel indicating that service is required, or the signal may include more information regarding the nature of the fault.

According to an alternate embodiment, the control unit is programmed to rapidly pulse the valve 120 in place of or in addition to the step of moving the displacement to zero, at step 708. The pulsing may serve to free contaminants from the valve or actuator and permit the system to return to normal operation.

According to another embodiment, two sensors 156 are provided, each configured to detect the displacement position of the motor 110. If the two sensors disagree as to the displacement of the motor, data from each is compared to the commanded displacement, and the sensor that disagrees with the commanded displacement is ignored. The driver is notified of a NSF, but the system continues in otherwise normal operation. If, on the other hand, the two sensors agree with each other, but disagree with the commanded displacement, the process outlined in FIG. 7 is followed.

According to a further embodiment, a parallel displacement control valve is provided, such that, in the event of a stuck displacement determination by a process such as that illustrated in FIG. 7, the control valve 120 is removed from the circuit (by a shut-off valve), and the parallel control valve is activated to supply high- and low-pressure fluid to the actuator 118. Thus, if the problem is in the control valve, the driver is notified of a NSF, while the system remains operational.

According to an embodiment of the invention, a process is provided for monitoring the condition of the gas cells 107, 109 of the LPA 106 and the HPA 108, respectively. It will be recognized that as high-pressure fluid flows into or out of the HPA 108, the pressure within that accumulator will change accordingly. Likewise, as low-pressure fluid flows into or out of the LPA 106, the pressure within that accumulator will also change accordingly. In a closed system, such as that described with reference to FIG. 1, if fluid flows out of one accumulator, it must flow into the other at the same rate. This does not mean that changes of pressure in the accumulators will be of equal values, inasmuch as the HPA 108 is precharged to a much higher pressure than the LPA 106, but the changes of pressure can be correlated, and the pressure of one accumulator can be accurately predicted, given the pressure of the other.

Thus, if the measured pressure of one of the accumulators 106, 108 is not equal to the predicted pressure, based on the correlation with the pressure of the other accumulator, a fault condition exists, indicating either a loss of fluid from the system or a loss of pressure. If the loss of pressure is due to gas leaking from the gas cell 109 of the HPA 108, the pressure will rise at the LPA 106, and will actually be greater than what would be predicted, given the pressure at the HPA 108, so that the sum of the pressures of the HPA and LPA is actually higher than expected. Thus, such a gas leak can be distinguished from a fluid leak by the excessive rise in pressure of the LPA. On the other hand, if gas escapes from the gas cell 107 of the LPA 106, the escaping gas will remain in the LPA or become entrained in the fluid of the system, which may not result in a change of pressure, but will cause increased compressibility of the fluid, resulting in slower responses and reduced efficiency of the system. If the indicated leakage exceeds a first threshold, but is less than a second threshold, a NSF is indicated, and if the leakage exceeds the second threshold, an auto shut-down is performed and the operator is notified of a CSF.

According to an embodiment of the invention, the control valve 120 is configured to move the actuator 118 to zero the displacement of the motor 110 in the event power to the valve is lost. Depending on the configuration of the control valve, this may be accomplished in a number of ways. For example one or more springs may be provided that will move the valve to the second position, unless some other force exerts an opposing force. The opposing force is provided by the control unit, via a pilot valve, a solenoid, or other control means. Thus, if pressure to the pilot valve, power to the solenoid, or controlling signal from the control unit is lost, the springs will immediately move the control valve to the second position, zeroing the motor. In this way, system faults that cut off power to the control valve, and that might otherwise cause the motor to be locked at some positive displacement or move to a higher displacement, will instead cause the motor to move to a zero displacement. The actual configuration of such a valve will depend on factors such as the source of power for the valve, the style of valve employed, design of the actuator mechanism controlled by the valve, and the type of motor being controlled by the actuator. Patent application number [safe over-center app], previously cited and incorporated herein, discloses one such control valve for use with an over-center motor.

According to another embodiment, the mode valve 116 is configured to place the motor in an unpowered condition in the event of a loss of power to the valve. Thus, if power is lost to the valve for any reason, power is removed from the motor, preventing uncontrolled power to the motor. This may involve a valve having a spring configured to drive the valve to the neutral position if power is lost.

According to an embodiment of the invention, fluid pressure is monitored within the motor and pump casings. In most hydraulic pumps and motors, fluid inside the casing is vented to the low-pressure side of the system. In this way, fluid that inevitably leaks past the pistons and seals of the machine is returned to the low-pressure fluid supply. In the present embodiment, in the event of a machine failure in which a large quantity of high-pressure fluid escapes to the casing, the pressure sensor will detect a rise in pressure, and the control unit will execute an auto shut-down, or at the least, shut off high pressure to the machine.

According to some hybrid vehicle designs, additional motors are incorporated, either alongside the first motor, or coupled to another pair of drive wheels. According to an embodiment of the invention, in the event of a system failure that results in the inoperability of a motor, the inoperative motor is shut-out, while one or more remaining motors can operate in a "limp home" mode to permit the vehicle to operate at reduced capacity to avoid complete shut-down. Such system failures may include loss of displacement control, internal and external leaks in the fluid circuit of one or another motor, and other motor failures. The isolation of the inoperative motor can be accomplished by placing its respective mode valve in neutral, and commanding the motor to a zero displacement. With regard to the process described with reference to FIG. 7, the steps 718 and 720 are of particular use in systems employing more than one hydraulic motor. If the mode valve can be confirmed to be in its neutral position, the associated motor can be isolated from the system by the mode valve, without completely shutting down the system. In an alternative embodiment, isolation valves are provided, configured to separately isolate each of the motors so that, regardless of the type of failure, one motor can be completely isolated from the system while allowing the system to operate with the remaining motor(s). Vehicles employing more than one motor for operation are described in a number of references, including the following references: U.S. Pat. No. 6,718,080; and U.S. patent application Ser. No. 10/620,726; and U.S. patent application Ser. No. 11/233,822.

According to an embodiment of the invention, the ICE 102 and motor 110 are provided with over-speed protection, such that if the control unit detects the ICE or motor rotating at an excessive rate, power is removed from the machine to prevent damage.

According to an embodiment of the invention, a process is provided for controlling the regenerative braking system. When the driver applies pressure to the brake pedal, the control unit controls the motor to apply a reverse torque to the wheels, as described above. However, as the speed of the vehicle drops toward zero, the controller decreases the displacement of the motor to reduce the braking torque. At the same time, the friction brakes always remain operative such that if additional braking is required, a slight increase in pressure on the brake pedal engages the friction brakes. Thus, if the vehicle stops on a hill, for example, it is the action of the friction brakes that holds the vehicle in place. This avoids a problem of attempting to balance fluid pressure to hold the vehicle unmoving on an incline. Additionally, this serves to clean the brake rotors of debris and rust so they remain fully functional in the event of a loss of power to the motor, so that the driver always has brakes available. Additionally, if rotation sensors 146 coupled to the drive wheels 112 detect a significant difference in rotation of the wheels, indicating that a wheel is slipping, either while accelerating or braking, displacement to the motor is momentarily reduced to allow the slipping wheel to regain traction.

There are a number of conditions created by the operating principles of some hydraulic hybrid vehicles that can result in confusing or hazardous situations for a typical vehicle operator. For example, often, the vehicle systems are programmed to shut down the ICE if there is an adequate charge in the HPA. Thus, it is possible, when the vehicle is stopped, for the driver to forget that the vehicle is actually "running," because there is no outward indication that there is still power available. A driver could park the vehicle, leaving the power engaged, then leave the vehicle. There would then be some danger that another party, perhaps a small child, could enter the vehicle and unintentionally set the vehicle in uncontrolled motion. If a mechanic were to make the same mistake, then begin to disconnect a high-pressure fluid line, fluid could be discharged with a great deal of force, with the potential to cause serious injury.

According to various embodiments, features are provided that increase safety while the vehicle is stopped or being shut-down by the driver. For example, if the vehicle is traveling below a threshold speed of between around 1-5 mph, and if the shift indicator is in a moving position (i.e., D, L, or R), displacement of the motor 110 is controlled to a slight positive value such that when the vehicle is stopped, the driver must apply brakes to prevent the vehicle from creeping forward (or backward, if in reverse). This will tend to remind the driver to move the shift indicator to the P position. According to an embodiment, when the shift indicator is moved to the P or N positions, the ICE is started, regardless of the state of charge of the HPA. The running engine serves to remind the driver that the vehicle is still under power, and that the key must be moved to the "off" position. The shift indicator must be moved to the P position before the key can be removed from the slot, again reminding the driver to fully shut-down the vehicle. According to an embodiment, a pressure sensor is provided in the driver's seat. If the driver leaves the seat without turning off the key, or placing the shift indicator in P, an alarm is sounded to alert the driver to the omission.

Where appropriate, the term key should be construed broadly to include any mechanism configured to enable and/or disable operation of the vehicle, including switches or buttons, remote devices, etc.

When the key is moved to the Off position, the system shuts down in a manner similar to an auto shut-down as described with reference to FIG. 6. The motor is commanded to zero displacement; the mode valve is commanded to neutral; the ICE is shut down, the HPA valve is closed; the LPA valve is closed; and finally the control unit shuts down. High-pressure remaining in the system will gradually leak past seals and pistons to the low pressure side, until the pressure in the entire system is about equal to the LPA. According to an embodiment, the system includes a pressure relief valve that is opened after the HPA and LPA valves are closed, which vents pressure from the high-pressure side to the low-pressure side.

In many of the processes described in the present disclosure, some parameter of the system is measured. As used in the specification and claims, the term measure is not limited to actually obtaining a value for comparison or calculation. For example, the process described with reference to FIG. 7 includes measuring the actual displacement of the motor 110. While some systems may be configured to provide a true displacement value, there are many alternative solutions that are acceptable. In a system employing a bent-axis motor, a yoke of the motor is rotated through an arc, and displacement of the motor is commonly described in terms of stroke angle of the yoke. At a stroke angle of zero, the displacement is also zero, while as the angle increases, so too does the displacement, in a precisely known relationship. If the sensor 156 is a transducer configured to provide a voltage signal that varies directly with the angle of the yoke, the displacement of the motor can be accurately inferred from the value of the transducer signal. Furthermore, the control signal provided by the control unit to command the displacement of the motor may be nothing more than a voltage signal of a value that corresponds to the commanded displacement. Thus, the steps of measuring and comparing can be performed continuously by an electrical circuit configured to condition one or both of the voltage signals, from the transducer and the control unit, so that, if the actual displacement is equal to the commanded displacement, the values of the signals are equal, then continuously comparing the values, and outputting a fault signal if a difference between the values exceeds a reference value. It can be seen that, in the arrangement described, the displacement volume of the motor is not measured, in a narrow sense of the term, nor is such a value compared with a commanded displacement volume. Nevertheless, such a configuration would be considered to perform the steps outlined, and thus fall within the scope of the invention.

In a similar manner, measurement of other parameters, and performance of other processes, may be performed inferentially. The process described with reference to FIG. 6 includes measuring a flow rate at the HPA, and comparing the measured rate with a flow determined by the motor displacement and rotation. It is well known that it is much simpler and more economical to measure pressure of a fluid than flow. It is also known that a flow rate can be determined by measuring a difference in pressure at two points in a fluid transmission line, if pressure drop characteristics of the line are known. Accordingly, by comparing the fluid pressure at the sensor 134 with the pressure at the sensor 142 while the mode valve 116 is positioned to channel high-pressure fluid past the sensor 142, while the control valve 120 is in its third position, i.e., closed, and while the pump 104 is not in operation, the flow of fluid between the sensors can be determined, and compared to the flow indicated by the displacement and rpm of the motor as outlined in FIG. 6. if the values disagree, a fault exists in the circuit. Additional pressure sensors at other points in the fluid circuit can be used to determine fluid flow rates in other branches, confirming, for example, that all the fluid flowing from the HPA is flowing into the LPA, as described with reference to FIG. 5.

A number of processes have been disclosed, in accordance with various embodiments, for addressing safety concerns related to the operation of a hydraulic hybrid vehicle system. It will be noted that if all the disclosed processes were implemented in one vehicle, there would be considerable redundancy. Redundant safety processes are not intended to be mutually exclusive. While any of the disclosed processes may be implemented individually, utilizing redundant processes generally results in a significant increase in the overall safety of a system. Hydraulic systems in general are typically extremely robust and reliable. Nevertheless, in a vehicle that will be expected to remain in operation for many years, and travel thousands of miles, the possibility of malfunctions must be acknowledged.

Where a claim recites a step that is to be performed following the performance of a prior, conditional, step, the claim is to be construed to mean that the following step is not to be performed unless the conditions under which the prior step is to be performed are met. Additionally, where a claim recites a step that is to be performed prior to a conditional step, the claim is to be construed to mean that the conditional step is not to be performed unless the conditions under which the conditional step is to be performed are met after the prior step is performed.

The term critical system fault (CSF) is used in the claims to refer to a condition under which the system to which the term is applied cannot remain in operation, or should not remain in operation, in order to avoid damage to the system or some other hazardous condition.

The term non-critical system fault (NSF) is used in the claims to refer to a condition under which the system to which the term is applied can remain in operation, but may require service.

While the method and process steps recited in the claims may be presented in an order that corresponds to an order of steps disclosed in the specification, unless specifically indicated, the order in which steps are presented is not limiting with respect to the order in which the steps may be executed.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of operating a hydraulic hybrid vehicle system, comprising:
controlling, while a shift selector of the vehicle is in a position other than park or neutral, a displacement of a hydraulic motor, at least in part, in accordance with a position of an accelerator pedal, wherein the hydraulic motor is powered by pressurized fluid and configured to apply torque to drive wheels of the vehicle; and commanding the displacement of the motor to zero while the shift selector is in the park or neutral position.

2. The method of claim 1, comprising: starting, if an internal combustion engine is not already running, the internal combustion engine when the shift selector is moved to the park position; and running the internal combustion engine while the shift selector is in the park position and operation of the vehicle is enabled.

3. The method of claim 1, comprising: controlling, while the shift selector is in the park position, a throttle position of the internal combustion engine, at least in part, in accordance with the position of the accelerator pedal; and controlling, while the shift selector is in a position other than the park or neutral positions, the throttle position of the internal combustion engine in accordance with factors other the position of the accelerator pedal.

4. The method of claim 1, comprising: providing a signal if a driver of the vehicle leaves the vehicle driver's seat while operation of the vehicle is enabled.

5. The method of claim 1, comprising: providing a signal if a driver of the vehicle leaves the vehicle driver's seat while the shift selector is in a position other than park.

6. The method of claim 1, comprising: preventing removal of a key from the vehicle while the shift selector is in a position other than park.

7. The method of claim 1, comprising: setting a displacement of the hydraulic motor to a value sufficient to cause the vehicle to creep in a direction indicated by the shift selector, while the shift selector is in a position other than park or neutral, an accelerator pedal is not depressed, and the vehicle is traveling at less than a threshold speed; and setting the displacement of the hydraulic motor to zero while the accelerator pedal is not depressed and the vehicle is traveling at more than the threshold speed.

8. The method of claim 1, comprising: signaling a shutdown of the vehicle system; disabling operation of the vehicle; commanding the hydraulic motor to a zero displacement; commanding a mode valve to a neutral position; shutting down an internal combustion engine; closing a high-pressure fluid supply valve after performing the commanding steps and the shutting down step; and closing a low-pressure fluid supply valve after performing the commanding steps.

9. The method of claim 1, comprising: controlling, while the shift selector is in a position other than park or neutral, a mode and displacement of the hydraulic motor, at least in part, in accordance with a position of a brake pedal, such that when the brake pedal is applied, a torque opposing a direction of travel of the vehicle is applied; and reducing the displacement of the hydraulic motor toward a displacement of zero as a speed of the vehicle approaches zero, regardless of the pressure applied to the brake pedal.

10. The method of claim 1, comprising: momentarily reducing displacement of the motor, regardless of the position of the accelerator pedal or of a brake pedal if while the vehicle is moving, a rotation speed of one of two drive wheels is significantly greater than a rotation speed of the other of the two drive wheels.

11. The method of claim 7 wherein the threshold speed is less than about five miles per hour.

12. The method of claim 8, comprising: checking, immediately following the signaling step and before performing any other step, a position of a shift selector; and canceling the remaining steps if the shift selector is not in the park position.

13. The method of claim 8, comprising venting fluid pressure from a high-pressure portion of the system to a low-pressure portion of the system after performing closing the high-pressure fluid supply valve.

14. The method of claim 9 wherein the reducing step comprises reducing the displacement of the hydraulic motor toward a displacement of zero as the speed of the vehicle approaches zero, such that the displacement of the motor is at zero while the vehicle is traveling below a threshold speed.

* * * * *